June 30, 1959 C. R. MAYO ET AL 2,892,391
ELECTROPHOTOGRAPHIC CAMERA APPARATUS
Filed Nov. 8, 1952 5 Sheets-Sheet 1

INVENTORS
CLYDE R. MAYO
BERNARD J. WOLFE
BY Frank A. Steinhilper
ATTORNEY

INVENTORS
CLYDE R. MAYO
BERNARD J. WOLFE
BY Frank A. Steinhilper
ATTORNEY

June 30, 1959  C. R. MAYO ET AL  2,892,391
ELECTROPHOTOGRAPHIC CAMERA APPARATUS
Filed Nov. 8, 1952   5 Sheets-Sheet 3

INVENTORS
CLYDE R. MAYO
BERNARD J. WOLFE
BY Frank A. Steinhilper
ATTORNEY

June 30, 1959
C. R. MAYO ET AL
2,892,391
ELECTROPHOTOGRAPHIC CAMERA APPARATUS
Filed Nov. 8, 1952
5 Sheets-Sheet 4
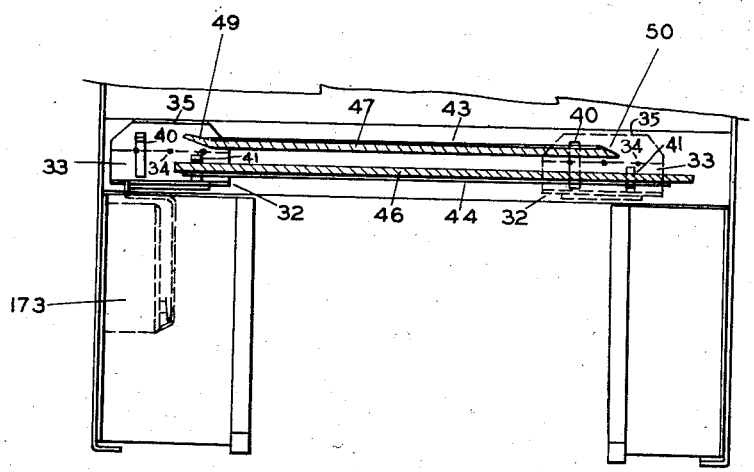
FIG. 4
FIG. 5
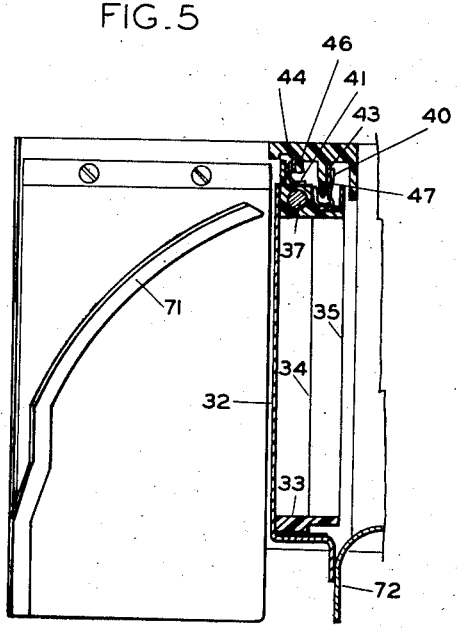
FIG. 6
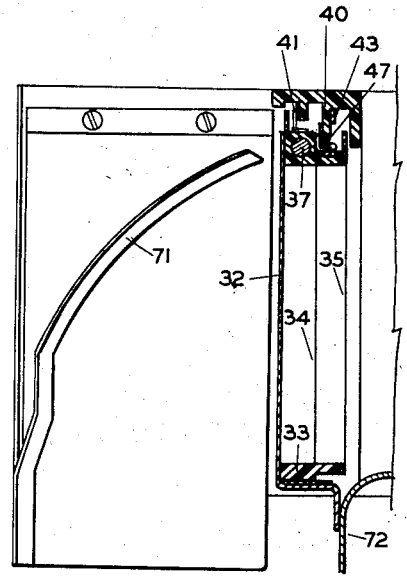
INVENTORS
CLYDE R. MAYO
BERNARD J. WOLFE
BY Frank A. Steinhilper
ATTORNEY

INVENTORS
CLYDE R. MAYO
BERNARD J. WOLFE

Frank A. Steinhilper
BY
ATTORNEY

United States Patent Office 2,892,391
Patented June 30, 1959

2,892,391

ELECTROPHOTOGRAPHIC CAMERA APPARATUS

Clyde R. Mayo and Bernard J. Wolfe, Rochester, N.Y., assignors to The Haloid Xerox, Inc., Rochester, N.Y., a corporation of New York Application November 8, 1952, Serial No. 319,472

6 Claims. (Cl. 95—1.7)

This invention relates in general to electrostatic electrophotography, otherwise known as xerography, and in particular to a self-contained xerographic camera.

As disclosed in Carlson Patent 2,297,691 the process of xerography operates by electrostatic means to create an electrostatic latent image which is developed by means of a finely divided electroscopic material. A purpose of the present invention is to provide new apparatus and a combination process in improvement to the Carlson invention whereby xerographic reproductions of substantially photographic quality can be produced.

It is, therefore, an object of this invention to provide a xerographic camera adapted to sensitize and expose an electrophotographic plate and to develop a continuous tone visible image on said plate, whereby a xerographic picture is produced by the mechanism.

It is another object of the invention to provide a xerographic camera adapted to charge a xerographic plate, expose it to an optical image, develop the resulting continuous tone electrostatic latent image and transfer the developed image to another surface and fix it thereon thereby yielding a completed xerographic print.

It is still another object of the invention to provide a xerographic camera comprising a camera housing having a lens or lens system therein, means to support a xerographic plate in the focal plane thereof, means to charge the surface of the plate and means to apply a charged finely divided material to the surface of the xerographic plate within an extremely thin development space between the plate and an adjacent development electrode.

It is a further object of the invention to provide a xerographic camera comprising the means and structures defined above together with means for subsequently pressing a tacky surface against the developed plate and removing such tacky surface therefrom, whereby the developed image is transferred to a second surface and fixed thereon and is useful thereon as a completed continuous tone xerographic print.

Additional objects of this invention will in part be obvious and will in part become apparent from the following specifications and from the drawings in which:

Figure 4 is a fragmentary top view of an internal portion of the device shown in Figures 1 and 2 illustrating in particular a conductive charging track therein;

Figure 5 is a fragmentary side cross section of the charging mechanism in the device shown in the previous figures, the charging mechanism being in its operation position;

Figure 6 is a like view of the same mechanism in its non-operating or non-charging position, and, Figure 7 is a top view of the development and fixing portion of the device shown in the previous figures;

Figure 1:
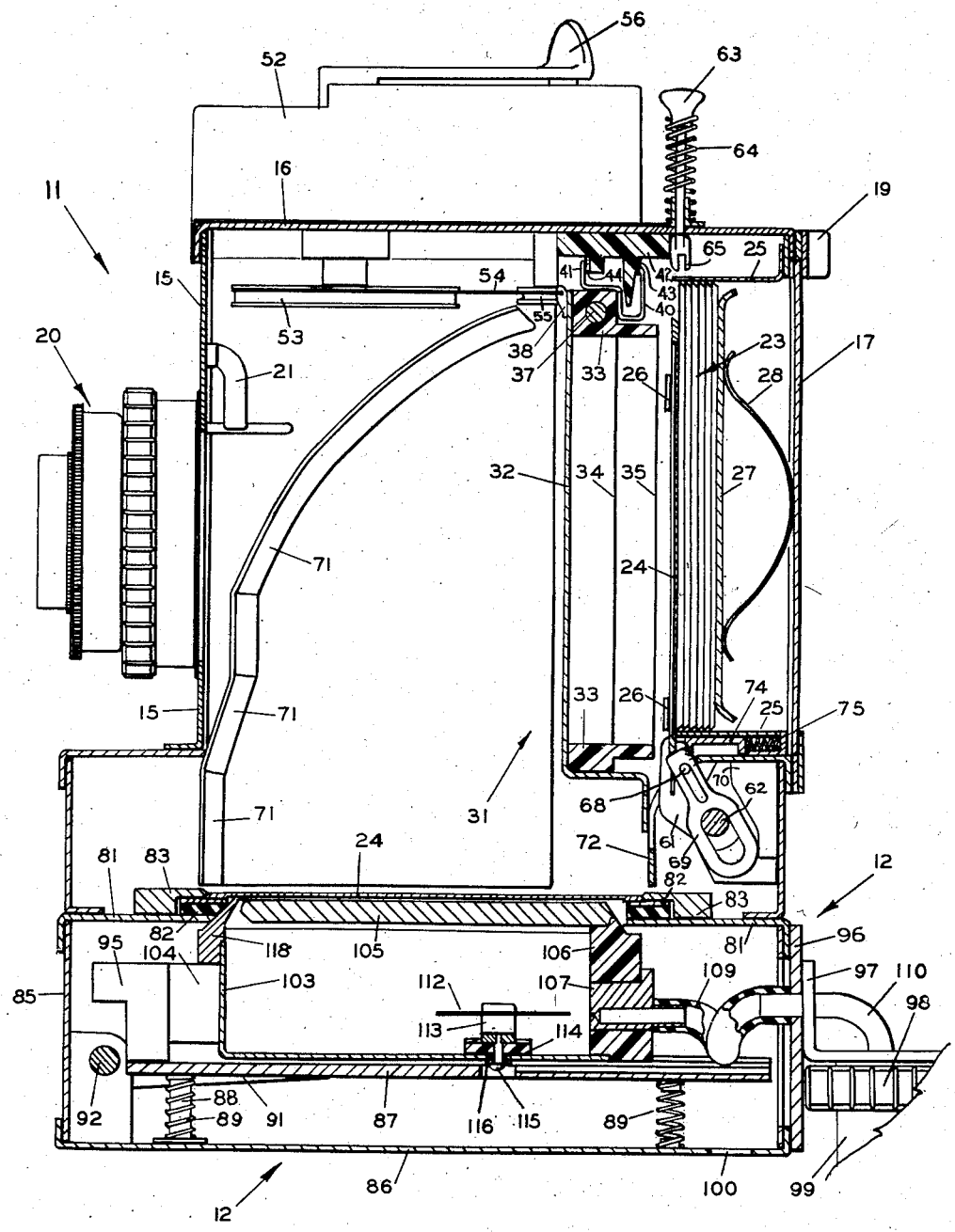
Figure 1 is a side cross section of a xerographic camera according to one embodiment of this invention.

The device shown in the drawings (Figs. 1 and 3) includes the general parts and mechanisms consisting of a camera housing 11 and a lower or development housing 12 with a transfer housing 13 all being integral parts of the entire housing of the camera device. The combination device is constructed and adapted to charge or sensitize the xerographic plate and to expose the sensitized plate in the upper or camera housing, transport it therefrom to the lower or development housing where the latent image is treated with an electroscopic material for development of the image, and to carry the plate through the transfer and fixing housing where the developed image is transferred to a suitable transfer base and is fixed to yield a finished xerographic print. Accordingly, the apparatus of the present invention is a new combined electrophotographic unit adapted to make and produce a complete xerographic print or picture.

Figure 2:
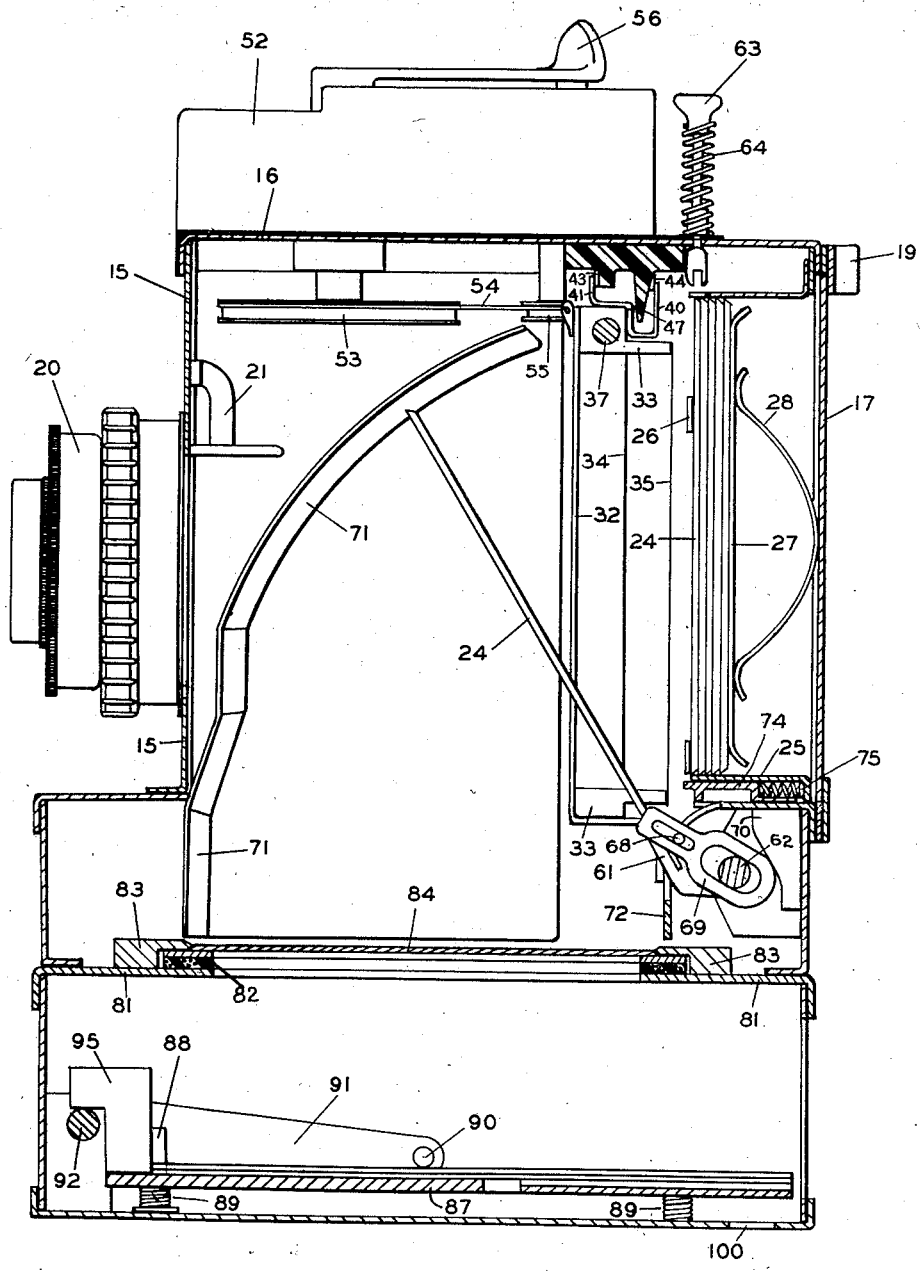
Figure 2 is a like view of the device in a subsequent stage of operation.

The apparatus, shown in its composite form in Figures 1 and 2, comprises a camera housing 11 having a front wall 15, a top wall 16, a back wall 17 and side walls 18 forming a light tight housing. Preferably the back wall is removable, being secured to the remainder of the housing by means of a back wall catch or securing member 19. Mounted on the front wall of the camera housing is a lens unit designated 20 which is securely mounted in the wall and additionally supported by lens support 21 to fix it in position and secure it against rotation or other movement.

Positioned at the rear wall of the camera housing is a magazine 23 of xerographic plates 24. Preferably the xerographic plates 24 have an edge or border which is somewhat raised above the surface of the sensitized portion, as can particularly be seen in Figure 1. In this manner the plates may be stacked in a magazine and may be moved with respect to one another without damage to the delicate sensitized layer and, as will be apparent hereinafter, the plates are particularly adapted to be disposed at a fixed, extremely small spacing with respect to a counter electrode during the development step.

As illustrated in the figures, the magazine of plates is positoned adjacent to the back wall of the camera housing and rests within magazine housing walls 25 with the front plate of the magazine being disposed at the focal plane in a position determined by cantilevered springs or stops 26. A feed plate 27 is mounted on back wall 17 by means of spring 28 whereby the magazine is forced snugly but lightly against the stops.

Directly in front of the focal plane is a corona discharge electrode, generally designated 31, comprising a ground plate 32 with terminal blocks 33 mounted on the ground plate and having corona discharge elements or wires 34 and a corona control member or screen 35 mounted therebetween. The entire electrode assembly is movable along a track or guide 37 and is adapted to be propelled along said guide by means of drive member 38 whose operation will be further described. The construction and interaction of the corona discharge electrode and its track and electrical contact slips is seen more completely in Figures 4, 5 and 6. Mounted on terminal blocks 33 or preferably on at least one of said blocks are a corona electrode spring contact 40 and a control electrode spring contact 41. This electrode assembly is shown in outline twice in Figure 4, at the left in its rest position and at the right in its charging position during passage across the focal plane. Adjacent to the electrode assembly and running parallel with its path of motion across a focal plane is an insulating contact track 42 bearing a conductive corona contact strip 43 and a conductive control electrode contact strip 44. As is seen particularly in Figure 4, a control electrode strip is mounted on its own track support 46 along one side thereof and the corresponding spring contact is adapted to ride thereon, while the electrode follows its path back and forth across the focal plane. The corona contact strip 43 is mounted on one side, for example, the rear side of its track support 47, and the corresponding spring contact 40 is disposed and adapted to make contact with the strip only in one direction of travel of the electrode across the focal plane. Accordingly the track support 47 has beveled ends 49 and 50 which at the starting end direct the spring contact to the side of the track support away from the contact strip and at the other end direct this spring contact to the side of the track support bearing the contact strip as particularly illustrated in Figures 5 and 6. In this manner contact is made only during the return trip across the focal plane and not during the preliminary or first trip thereacross in the "winding up" direction. The control electrode contacts, to the contrary, are constantly engaged.

Externally mounted on the upper wall 16 of the camera housing is a drive means such as a spring drive motor 52 operating drive pulley 53 within the camera housing. A pulley cable 54 is in turn operated by pulley 53 around an electrode pulley 55, being secured to drive member 38 mounted on the electrode assembly. Operating means such as a handle 56 is mounted on the drive motor whereby it may be manually operated to drive the electrode assembly across the focal plane. Preferably, the spring drive motor is constructed to permit the motor to be activated or wound up manually by the operating handle while moving the electrode assembly in one direction across the focal plane and then, upon release of the manual operation means, to drive the electrode at a constant speed in the reverse direction across the focal plane. Cooperating with this two way motion of the spring drive motor and manual operation means, the corona electrode spring contact member makes contact with its corresponding contact strip only during the reverse or spring driven motion of the electrode assembly, whereby the corona discharge electrode is energized only while the electrode is being driven at uniform speed by the spring drive motor. In cooperation with this construction and combination of members the spring drive motor is of conventional design adapted to drive the mechanism under comparatively heavy load at a uniform rate of speed.

Referring again to Figures 1 and 2 it is seen that a pair of jaws 61 is fixed on an axle 62 and movable by handle 67 (see Figure 3) and adapted to receive the front one of the magazine of xerographic plates. Mounted directly above such plate is a plunger 63 with a spring 64, the plunger projecting through the upper camera housing wall and having a plunger head 65 on the lower end thereof. This plunger assembly is adapted to be manually depressed from outside the camera housing to project the front plate of the magazine into the teeth of jaws 61. The axle 62 supporting the jaws is adapted to be rotated by an external handle 67 (see Figure 7) whereby the jaws carry the plate from its position in the magazine and direct it toward its position in the development housing as hereinafter described. Slidably mounted on the axle 62 and pin 68, and adapted to rotate with the jaws, is a sliding ejector 69 riding on a cam member 70, this ejector thus being disposed and positioned to eject the plate from the teeth of jaws 61. As illustrated in Figure 2, guide channels 71 and apron 72 operate to direct the plate, after its release from the jaws, to its development position as hereinafter described. Cooperating with the jaws 61 is a sliding shelf 74 mounted by springs 75 directly below the magazine housing, this sliding shelf being adapted to slide forward following the receiving jaws whereby it slides under the front position of the magazine and protects the xerographic plates therein from dropping below their normal exposure position.

The lower or development portion of the apparatus directly below the camera housing is positioned to receive the xerographic plate when it is moved from the focal plane by jaws 61. This lower housing is separated from the upper housing by means of a barrier wall 81 on which are mounted plate support members 82 adapted to receive the plate from the jaws. Movable gibs 83 are positioned on the barrier wall 81 directly adjacent to the plate support members 82 and are adapted to be slid back to receive a new plate and then slid together to clamp the plate in position on the plate support members. An opening 83a directly below the plate in this position is adapted and disposed to allow electroscopic material to be brought into contact with the xerographic plate when supported on its support members 82. A movable slide 84, (see Figure 7), which may here be considered a dust shield, is normally positioned on the plate support members and held by gibs 83. This slide is adapted to be partially removed to allow the latent image bearing plate to be received into the position for development.

The development or lower housing 12 which is position directly below barrier wall 81 comprises side, front, and back walls 85 and a base wall 86 on which is mounted a development bed plate 87. This development bed plate preferably is mounted on side studs 88 and supported by springs 89 whereby it may be raised or lowered with respect to the development base. A depressing guide 90 (see Figure 2) operated by lever 91 is movable by shaft 92 controlled by an externally located handle 93 (see Figure 3) to lower the development bed plate as desired where it is held in the lower position by a latch spring (not shown). A friction power plug member 95 is mounted at one end of the bed plate to receive a development box and its electrical power connections, holding the box in place and connecting the electric leads to it. One wall of the development housing, preferably the wall opposite the power plug member has an opening through which a development box may be inserted and over which is secured a support plate 96 secured by clamps 96a (Figure 7) bearing an angle brace 97 on which is mounted a powder container cover 98, (see Fig. 1.), in turn adapted to receive a developer supply chamber or powder can 99. An opening 100 is provided in the base of the development housing to permit exit development powder and air supply to leave the development chamber. Desirably the support plate 96 is removably secured to the development housing by means of clamps whereby easy access to the interior developing housing is achieved.

In Figure 1 is illustrated a developer box positioned on the bed plate in a position for the developing operation. This developer box comprises essentially a walled container 103 having a male power plug 104 adapted to be plugged into the power plug member 95 whereby the development box is positioned with the development housing. The top of the development box is open and a conductive counter electrode 105 extends substantially thereacross. This electrode preferably is mounted on an insulating block 106 which has a conductive jet block 107 inset therein. The jet block 107 terminates inwardly in a jet adapted to spray a powder cloud into the interior of the development box. The rear or powder end of the jet is connected by a flexible tube 109 to a powder tube 110 which in turn leads to the powder can 99 whereby a powder cloud is generated in the powder can, is fed to the jet block and thence as a powder cloud into the interior of the development box.

Positioned directly in front of the jet is a corona electrode needle 112 mounted on an electrode clamp 113 which in turn is secured to an insulating washer 114 by means of a screw connector 115 which serves the dual purpose of securing the clamp to the washer and providing a point for electrical connection to the electrode needle. Preferably an insulating inset 116 is mounted in the base of the developer box to receive the screw connector 115 whereby it is insulated from the body of the box.

A guide block 118 is mounted around the top edge of the developer box and forms a narrow channel in cooperation with the edge of the counter electrode 105. Desirably this counter electrode and the lower surface of the xerographic plate, when mounted on its support members, are in extremely close proximity to each other, preferably being separated by an air gap substantially less than 1/8" and usually in the order of about 1/40 inch. This spacing may, if desired, be the thickness of the raised border on the xerographic plate. The operation of the development electrode or counter electrode 105 in conjunction with the xerographic plate is presently believed to be to cause the electrostatic field of force from an electrostatic latent image on the xerographic plate to operate into the air space immediately adjacent to the surface of the plate rather than being directed through the plate toward its conductive backing. The operation of this electrode and the structure and the operation of the entire developing mechanism is described in full and claimed in co-pending application S.N. 244,556, filed August 31, 1951, now Patent No. 2,725,304, granted November 29, 1955.

Figure 7:
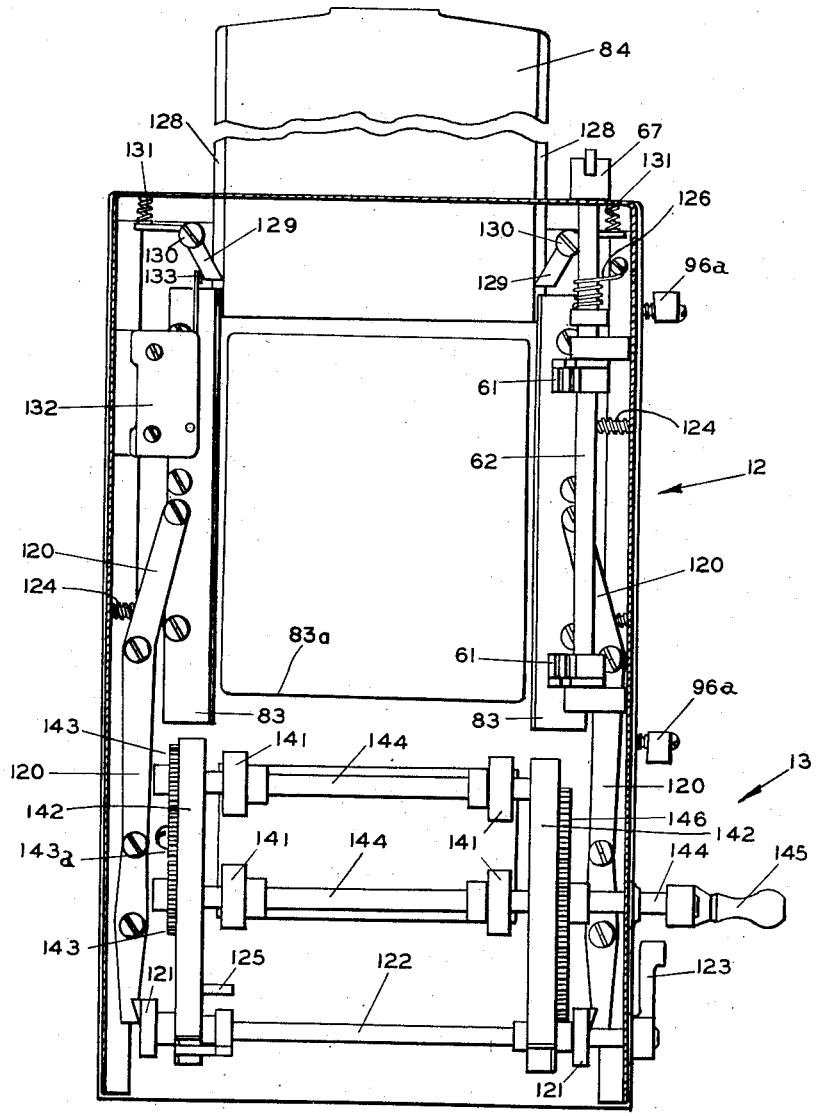

In Figure 7 there is shown in greater detail the operation of gibs 83 and slide 84 in conjunction with other apparatus and mechanism as described herein. Gibs 83 are slidably mounted directly above the plate support members 82 on barrier wall 81 and are controlled by a series of levers 120 operated by cam 121 which in turn is moved by shaft 122 operated by externally located handle 123. The gibs are slidably mounted against springs 124 which force the gibs into firm contact with either slide 84 or the xerographic plate 24, whichever one is positioned there. A stop 125 is mounted to limit the rotary motion of cams 121. In this Figure 7 are also shown the jaws 61 mounted on shaft 62 with spring 126 operating to return the jaws to their upper position.

The slide 84 is also illustrated in Figure 7 wherein are shown other cooperative functions thereof. The slide has on either side thereof a sliding flange 128 adapted to slide under gibs 83 and be thereby secured in place. A pair of stops 129 are mounted on pivots 130 with spring 131 adapted to pivot these stops into contact with the slide. Near the inner end of the slide are slots illustrated as being engaged by the stops 129 which limit the withdrawal of the slide from the position within the apparatus. A micro switch 132 with contact arm 133 is disposed and adapted to be opened and closed by the motion of one of these stops 129 into a V-slot in the slide 84, whereby the developing operation of the apparatus is electrically energized only when the slide is in this removed position.

Figure 3:
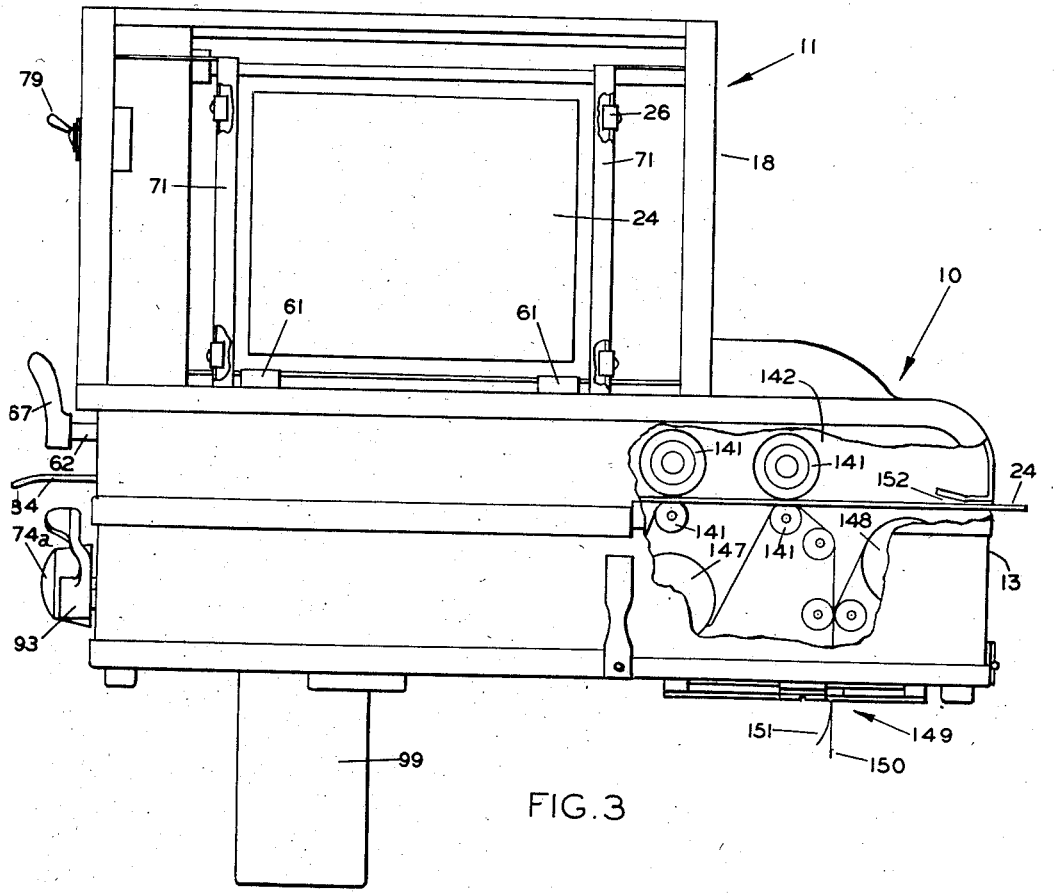
Figure 3 is a front view of the same device with the front or lens wall removed to show internal structure.

Directly to the side from the development housing is the transfer housing 13 as illustrated particularly in Figures 3 and 7. In this transfer housing are mounted pressure rolls 141 in journals 142 adapted to be driven by gears 143 operated with reversing gear 143a from shaft 144 connected to an externally positioned handle 145. A second gear 146 on shaft 144 optionally drives web feed mechanism within the transfer unit. An adhesive web supply 147 and a fixing web supply 148 are mounted in the transfer housing and are adapted to feed adhesive and fixing webs to a xerographic plate when fed therethrough. The arrangement of the rollers is such as to strip the adhesive web from the xerographic plate after transfer and feed it through a cutting assembly 149 positioned externally below the transfer housing, yielding a finished print 150 and optionally an interleafing web 151 which may be interwound with the adhesive web in the web supply 147. Adhesive transfer and fixing apparatus such as is briefly described herein is completely disclosed and claimed in co-pending application S.N. 267,444, filed January 24, 1952, now Patent No. 2,661,289, granted December 1, 1953.

In this connection a further function of the slide 84 in cooperation with the apparatus is observed. It is remembered that the slide and the xerographic plate in a development position are co-planar, with the new result that the slide when inserted into the apparatus meets the xerographic plate and is adapted to propel it therewithin. The adhesive transfer mechanism is so positioned that the slide 84 is adapted to force the xerographic plate directly into the first of the pressure rolls 141 while sealing the development chamber against loss of developer powder into the body of the camera, the plate eventually emerging through slot 152 in the housing (see Figure 3). This slide upon reinsertion into the apparatus after the development step feeds the xerographic plate into position for the adhesive transfer and fixing step.

Figure 8:
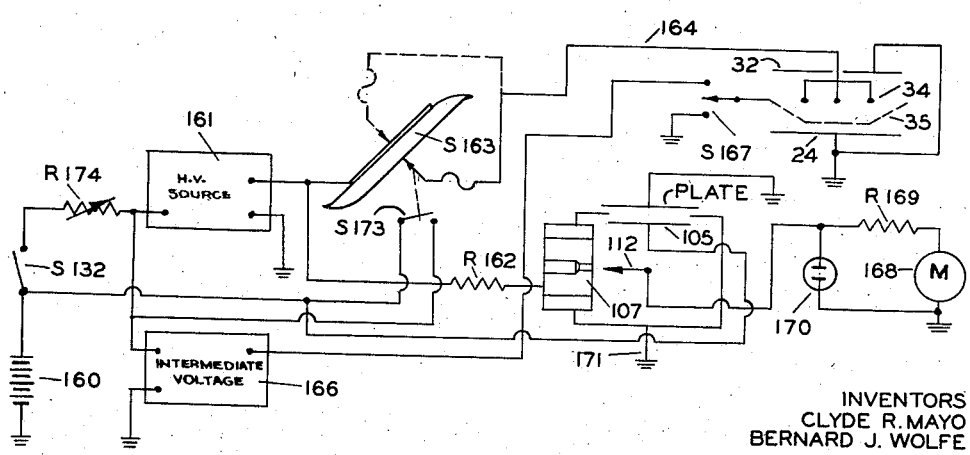
Figure 8 is a wiring diagram, partially in block form, of an electrical circuit for the device shown in the other figures.

In Figure 8 is shown partially in block diagram an electrical circuit particularly adapted to operate with the mechanisms described herein. According to this circuit, a power supply such as, for example, a low voltage D.C. power supply which may, if desired, be a series of batteries 160 or the like, is adapted to operate a high voltage source 161. This high voltage source desirably may be conventional in design and adapted to operate from a direct current power supply by means of a vibrator and suitable transformer circuits, rectifiers, and the like, and is generally adapted to supply a direct current output adjustably in the order of about 7,000 volts. One terminal of this high voltage source is connected to switch S163, which, in Figures 4 to 6 is the corona contact strip 43 and its corresponding spring contact member. This spring contact member is connected through lead 164 to the corona discharge wires 34 whereby the corona electrode is energized by the high voltage source. Desirably, ground connections are provided to the backing plate 32 of the electrode and to the backing member of the xerographic plate 24.

An intermediate voltage source 166 is also operated from the primary power supply 160 and desirably may comprise an intermediate voltage tap from the high voltage source 161 and optionally is adjustable. Preferably this potential is in the order of 60 to 100 volts positive. The output of the intermediate voltage source 166 is connected to one pole of a selector switch 167 (toggle switch 79 in Figure 3) which in turn is connected to the corona screen control member or screen wires 35. The alternate pole of the selective switch may be connected to ground, whereby the screen wires 35 may as desired be connected either to the intermediate voltage or to ground voltage.

A second terminal of the high voltage source is connected to the jet block 107 of the power supply system connected through resistance 162. This circuit is completed by the connection of the corona electrode needle 112 through a meter 168 to ground whereby negative rather than positive corona is generated from the corona needle. There is protective system for a meter consisting of meter 168 of a resistance R169 in series with the meter and in parallel with a neon tube 170. Desirably, the entire developer box 103, except for the active electrode members, has a ground connection of 171.

A low voltage or battery circuit connection is made from the primary power supply to the development counter-electrode 105 within the developer box. In this manner the development counter-electrode is biased as desired at the fixed or battery potential or, by obvious variations, at any other desired potential.

A series of switches, controls, and other members partially automatic and partially interlocking are supplied for operating and energizing the mechanisms at the desired time. Thus, switch S163 is mechanically interlocked with second switch S173, optionally by mounting switch S173 to the operating handle 56 of motor 52, this switch being so mounted that it is closed during the entire time when this handle is out of its resting position. Thus, when this handle is moved, winding up the spring motor to transport the electrode assembly across the focal plane, the high voltage source 161 is energized whereby the corona wires become active during the return trip of the electrode across the focal plane. A further switch S132, being the microswitch 132 described in connection with Figure 7, is in parallel with switch S173 and is operated by insertion or removal of the slide 84 whereby the high voltage source is again energized for the powder charging corona electrode system 31 when this slide is removed from the camera mechanism to its stop position. A variable resistor R174 (controlled by knob 174a, Figure 3) in series therewith controls the potential of the high voltage source during this phase of operation in coordination with meter 168, affording control of the corona discharge current from needle electrode 112 during development cycle.

The use and operation of the mechanism is extremely simple since the mechanism is particularly designed for simple operation. Prior to use the camera and transfer mechanism is properly loaded with a magazine of xerographic plates and with suitable transfer and fixing rolls properly wound on the rollers. The spring motor 52 is then operated by rotating handle 56 and allowing it to re-wind itself after complete manual unwinding. In this phase of the operation the corona discharge electrode 34 is carried across the focal plane and then returns at a uniform rate of speed with the electrode energized by the power supply so that a uniform electrostatic charge is deposited on the surface of the front plate of the magazine of xerographic plates. The optical exposure then is made with the result that the optical image causes selective dissipation of this uniform charge potential to form electrostatic latent image on the plate.

The plunger and jaws are then operated to move this plate to its development position. Shield 84 is then removed to the stop position and the gibs are operated to receive the plate and hold it firmly in close proximity to the counter electrode in the developing mechanism. It is observed that the removal of this shield automatically energizes the developer charging system. Development or deposition of powder in corresponding with the electrostatic latent image is then accomplished by operating the developer cloud mechanism by means of supplying air to the mechanism from a suitable air source. The supply of air is mixed with powder in the powder cloud generator and carries such powder through the charging zone and thence to the development zone wherein the charged powder is attracted to the electrostatic latent image.

Closing of the slide 84 propels the developed xerographic plate before the slide and causes it to be moved into the adhesive transfer mechanism, whereby transfer is accomplished by means of the transfer rolls as shown, for example in application S.N. 231,731, filed June 15, 1951 and now abandoned. A finished xerographic print or sandwich of the transferred powder between the transfer and fixing sheets emerges from the mechanism as the rollers are operated, and the print is cut off as desired.

What is claimed is:

1. An electrostatic electrophotography camera comprising a camera housing and a development housing integrally a part thereof, an optical exposure system to project a light image onto a focal plane within the camera housing, means to support an electrophotographic plate, comprising a photoconductive insulating layer on a conductive backing, with the photoconductive insulating layer at the focal plane, a pair of guide rails arranged parallel to the focal plane of the camera, a carriage mounted for movement on said guide rails, a corona discharge electrode mounted on said carriage, means for causing reciprocating movement of said carriage on said guide rails, a high voltage source for energizing said electrode to deposit an electrostatic charge at the focal plane, switching means operative to engage the high voltage source with the electrode during the movement of said carriage in one direction, means to transport the electrophotographic plate to the development housing, a conductive electrode closely spaced and parallel with the position of the photoconductive insulating surface of the electrophotographic member in the development housing, a source of a cloud of powder particles and means to convey such cloud into the space between the parallel-positioned electrophotographic plate and conductive electrode, a corona discharge electrode for imparting to the particles an electrostatic charge of polarity opposite to that deposited by the sensitizing charging electrode, a power supply energizing the plate charging corona discharge electrode and the powder charging electrode, a control switch interlocked with the constant speed drive means to activate the power supply to the plate charging electrode while the electrode is in front of the focal plane, a sliding shield between the camera housing and the development housing, and a control switch interlocked with said shield to activate the power supply to the powder charging electrode, when the shield is withdrawn from its position between said housings.

2. In a xerographic camera apparatus including a light-tight housing having a lens element in one wall thereof for focusing a light image at the focal plane of the camera, the combination of means for supporting a xerographic plate at the focal plane of the camera during charging and exposing of the plate, a pair of guide rails arranged parallel to the focal plane of the camera, a corona discharge electrode mounted for movement on said guide rails, motive means for moving said electrode on said guide rails, a high voltage source for energizing said electrode to deposit an electrostatic charge on the plate, and switching means operative during such movement for connecting the electrode to the high voltage source to energize said electrode whereby an electrostatic charge is deposited on the plate while the plate remains in the focal plane of the camera.

3. In a xerographic camera apparatus including a light-tight housing having a lens element in one wall thereof for focusing a light image at the focal plane of the camera, the combination of means for supporting a xerographic plate at the focal plane of the camera during charging and exposing of the plate, a pair of guide rails arranged parallel to the focal plane of the camera, a carriage mounted for movement on the guide rails, a corona discharge electrode mounted on the carriage, means for causing reciprocating movement of said carriage on the guide rails, a high voltage source for energizing said electrode to deposit an electrostatic charge on the plate, and switching means operative for connecting the high voltage source with the electrode during the movement of the carriage, whereby an electrostatic charge is deposited on the plate surface while the plate remains in the focal plane of the camera.

4. In a xerographic camera apparatus including a light-tight housing having a lens element in one wall thereof for focusing a light image at the focal plane of the camera, the combination of means for supporting a xerographic plate at the focal plane of the camera during charging and exposing of the plate, a pair of guide rails arranged parallel to the focal plane of the camera, a carriage mounted for movement on the guide rails, a corona discharge electrode mounted on the carriage, means for causing reciprocating movement of said carriage on the guide rails, a high voltage source for energizing said electrode to deposit an electrostatic charge on the plate, and switching means operative for connecting the high voltage source with the electrode during the movement of the carriage in one direction, whereby an electrostatic charge is deposited on the plate surface while the plate remains in the focal plane of the camera.

5. In a xerographic camera apparatus including a light-tight housing having a lens element in one wall thereof for focusing a light image at the focal plane of the camera, the combination of means for supporting a xerographic plate in an exposure position at the focal plane of the camera during charging and exposing of the plate, a magazine arranged adjacent to the exposure position for supplying a plurality of xerographic plates, a pair of guide rails arranged parallel to the focal plane of the camera, a corona discharge electrode movable on said guide rails, motive means for moving said electrode on said guide rails to traverse the surface of a plate supported in the exposure position, a high voltage source for energizing said electrode to deposit an electrostatic charge on the plate, switching means operative during such movement for connecting the high voltage source with said electrode whereby an electrostatic charge is deposited on the plate while the plate remains in the exposure position of the camera, means for transporting exposed plates from the exposure position, means for advancing plates seriatim from the magazine to the exposure position and concomitantly engaging each advanced plate with the transporting mechanism, and means for actuating the transporting mechanism.

6. In a xerographic camera apparatus including a light-tight housing having a lens element in one wall thereof for focusing a light image at the focal plane of the camera, the combination of means for supporting a xerographic plate in an exposure position at the focal plane of the camera during charging and exposing of the plate, a magazine for supplying a plurality of xerographic plates, a pair of guide rails arranged parallel to the focal plane of the camera, a corona discharge electrode movable on said guide rails, motive means for moving said electrode on said guide rails to traverse the surface of a plate supported in the exposure position, a high voltage source for energizing said electrode to deposit an electrostatic charge on the plate, switching means operative during such movement for connecting the high voltage source with said electrode whereby an electrostatic charge is deposited on the plate while the plate remains in the exposure position of the camera, means for transporting exposed plates from the exposure position, means for advancing plates seriatim from the magazine to the exposure position and concomitantly engaging each advanced plate with the transporting mechanism, means for actuating the transporting mechanism, and means actuated by the last recited means to retain the remaining plates in the magazine during the actuation of the transporting mechanism.

References Cited in the file of this patent

UNITED STATES PATENTS

| | | |
|---|---|---|
| 256,148 | Lefeuvrier | Apr. 11, 1882 |
| 490,117 | Laighton et al. | Jan. 17, 1893 |
| 494,164 | Rice | Mar. 28, 1893 |
| 679,271 | Barnekov | July 23, 1901 |
| 1,549,875 | Horne | Aug. 18, 1925 |
| 1,653,408 | Olsen | Dec. 20, 1927 |
| 2,221,776 | Carlson | Nov. 19, 1940 |
| 2,357,809 | Carlson | Sept. 12, 1944 |
| 2,473,729 | Salz | June 21, 1949 |
| 2,477,291 | Fairbank | July 26, 1949 |
| 2,499,466 | De Forest et al. | Mar. 17, 1950 |
| 2,701,764 | Carlson | May 2, 1951 |
| 2,551,582 | Carlson | May 8, 1951 |
| 2,588,675 | Walkup et al. | Mar. 11, 1952 |
| 2,600,580 | Sabel et al. | June 17, 1952 |
| 2,633,796 | Pethick | Apr. 7, 1953 |
| 2,691,345 | Huebner | Oct. 12, 1954 |